United States Patent Office 3,424,574
Patented Jan. 28, 1969

3,424,574
FERROUS METAL REFINING
Meherwan C. Irani, 41 Vernon Drive,
Pittsburgh, Pa. 15228
No Drawing. Filed Oct. 22, 1965, Ser. No. 502,572
U.S. Cl. 75—53                                    12 Claims
Int. Cl. C21c 7/04

ABSTRACT OF THE DISCLOSURE

A process is provided for removal of copper from molten iron consisting of crystallizing a sulfate, sulfide or sulfite containing aqueous material such as waste pickle liquor, adding the dried or crystallized product to molten iron containing copper and removing the resulting slag from the surface of the molten iron after allowing sufficient time for the molten slag to dissolve the copper in the iron.

---

This invention relates to ferrous metal refining and sulfur bearing liquid treatment and particularly to a method of utilizing sulfur bearing liquids such as sulfate, sulfite and sulfide containing products, e.g., waste pickle liquor for removal of copper from copper contaminated iron and steel, e.g., automobile scrap.

It is well known in ferrous metallurgy that, due to contamination of automobile scrap with copper, it is uneconomical to process and dispose of this type of scrap. Copper is known to be one of the most annoying and persistent of residual alloys. Over the past several decades, the average residual percentage has gradually, yet continually, risen due to recycling of metal scrap and the inability to satisfactorily remove copper by any of the well known refining methods for iron and steel. Some steels, of course, desirably have small amounts of copper as a corrosion inhibitor, such as the low metalloid steels. Normally, however, copper is not desirable, because it tends to cause embrittlement above 2000° F. commonly known as "hot shortness" and tends to reduce the deep drawing characteristics of the steel.

A variety of methods have been attempted to solve the problem of copper removal. For example, solvent extraction with lead has been proposed, as have also removal by interdendritic displacement, by segregation during freezing and zone refining, by formation of volatile copper compounds and a variety of other ways. None of these methods has been satisfactory, either because of inefficiency or practical ineffectiveness or because of high cost.

The process of this invention is applicable for the solution of two urgent problems facing this country, the utilization of junked automobile scrap and the economical treatment of acid mine water, pickle liquors and like sources of sulfur containing waste liquors which have been in the past discharged into the streams of the country creating a serious pollution problem.

I have found that by adding a sulfate, sulfide or sulfite from waste sulfur containing liquids to molten iron or steel I can cause copper to form a slag component which is removed from the molten bath. In a preferred practice and embodiment of my invention, I have found that by adding an alkali metal, alkaline earth metal or aluminum capable of neutralizing or combining with waste sulfur bearing liquids I provide a material in the form of a sulfate, sulfite or sulfide of such alkali metal, alkaline earth metal or aluminum which when added to ferrous metal in the molten state will cause copper to be removed as a component of the slag.

I have found that by adding anhydrous soda ash (sodium carbonate) to the waste pickle liquor in sufficient quantity, the mixture turns to a greenish paste which on standing sets to a solid mass. The mixture has a greenish color when freshly prepared changes gradually to brown color. The change in color starts from the outside layer and progressively penetrates to the core of the mass. The cured product thus obtained is a mixture of sodium sulfate, iron carbonate and excess soda ash with all the water originally present in the waste pickle liquor tied up as $Na_2SO_4 \cdot 10H_2O$, $Na_2CO_3 \cdot 10H_2O$ and $FeCO_3 \cdot H_2O$.

The solidified product may be used as such for removing copper from copper containing iron as described in the example hereafter cited. However, I have found that a high purity, micron size iron carbonate product is obtained when the solidified cured mixture of soda ash and waste sulfuric pickle liquor is dissolved in water; sodium sulfate and sodium carbonate go into solution and iron carbonate settles down rapidly. The iron carbonate residue so obtained is easy to free by washing by decantation, of contaminants like sodium carbonate, sodium sulfate and other hydrated calcium, magnesium and other alkali and alkali earth compounds. The residual washed iron carbonate particles are of high purity and being not gelatinous dry readily at atmospheric temperatures producing free flowing noncaking iron carbonate from which high grade pigment of great hiding power could be prepared. The iron carbonate thus obtained is excellent for making high grade fine particle size pure iron powder and is also suitable for use as coating for manufacture of magnetic sound and television recording tape, manufacture of ferrites like barium ferrites which are increasingly being used as ferromagnetic materials for making cores of small electric motors, permanent magnets, etc. Since, for removal of copper from iron it is not essential to have iron carbonate in the mixture of soda ash and sodium sulfate, it may be economical to recover the iron by dissolving the above described cured mixture of waste sulfuric pickle liquor and soda ash in water and then after separation of the insoluble iron carbonate crystallize out the mixture of sodium sulfate and sodium carbonate from the aqueous solution and use it for removal of copper from iron as described in the example hereafter set out.

In the case of acid mine water which contains dissolved ferrous sulfate and free sulfuric acid and has a pH of about 3, enough soda ash (sodium carbonate) is added to the water to bring it to pH 8 when the free sulfuric acid is neutralized and ferrous sulfate precipitates with the formation of sodium sulfate which remains in solution. Other soluble impurities usually alkali-earth salts also precipitate as insoluble carbonates at pH 8. However, the precipitate is gelatinous and settles on standing to a gelatinous sludge containing 50 percent absorbed water. When the gelatinous precipitate is decanted, filtered and dried, it analyses about 30 percent ferric oxide even when the precipitated gelatinous sludge is repeatedly washed prior to filtration. The recovered mine acid water so treated is soft water of excellent quality for municipal and industrial use.

I have discovered that if the filtered precipitated gelatinous sludge is mixed with enough soda ash (sodium carbonate) to make a paste and the paste so prepared is allowed to stand for several hours, the paste sets to a hard mass and changes its color from greenish to brown as in case of the waste pickle liquor described above. Now, when the hardened cured product is dissolved in water, sodium sulfate and excess soda ash being water soluble are leached out and the iron as insoluble iron carbonate rapidly settles to the bottom in a non-gelatinous physical form from which it is easy to remove the impurities consisting mainly of alkali earth hydrated oxides or carbonates by repeated washing by decantation and filtration. The resulting iron carbonate is pure, of soft texture and of fine particle size suitable for use as pigment, for manufacture of high grade fine particle size iron powder, for manufacture of ferrites, etc. The filtrate obtained after removal of iron contains sodium sulfate and sodium carbonate in solution which may be removed by evaporating the solution and recovering the mixed sodium sulfate, sodium carbonate crystals. The mixed crystals after drying may be used for removal of copper from copper contaminated iron. However, if there is insufficient market for very large amount of iron oxide which could be produced by treating very large quantities of acid mine waters which have to be treated, it may not be practical to recover all the iron oxide but to use some of the unprocessed cured mixture or iron carbonate, sodium sulfate, and soda ash for purification of copper contaminated iron as described in the example cited in the patent proposal.

While I have described the use of soda ash for neutralizing the acid mine water to pH 8 and also mixing soda ash with gelatinous sludge resulting from neutralization of the acid mine water, it is understood that other alkali and alkali earth oxides, hydroxides and carbonates, anhydrous ammonia or mixtures of these may be used, as well as aluminum scrap, aluminum carbonate, oxides and hydroxides.

Alternatively to neutralizing and precipitating the sulfur bearing liquid I may feed the neutralized sulfur bearing liquid at the top of a cupola or blast furnace, or to the tuyeres, or feed the sulfur bearing liquid and neutralizing alkali or alkaline earth metal simultaneously to the top of the cupola or blast furnaces or to the tuyeres. Alternatively the sulfur bearing liquid with neutralizer can be used as a quench on coke to be used in blast furnace operations. In all cases, a satisfactory alkali metal, alkaline earth metal or aluminum compound of the sulfur in the waste liquid results and removal of copper from the ferrous metal treated promptly results.

Starting materials for the process may be byproduct sulfate pickle liquor, byproduct sulfite liquor from paper and pulp industry, byproduct ferrous sulfate from manufacture of titanium dioxide from ilmenite, waste sulfuric acid from petroleum refining, spent sulfur containing products from processing of ores, metals, and minerals, and other byproduct sulfur containing compounds. These materials furnish source of sulfur for the sulfur containing alkali metal compound required for the process.

The iron from which copper is to be removed may be iron and steel automobile scrap, other copper contaminated iron and steel scrap, copper coated iron or steel scrap generated as "home" scrap in manufacture of copper clad or copper coated iron and steel products, iron resulting from blast furnace smelting of iron ores containing copper, iron smelted from iron containing slags resulting from smelting of copper and any other products of iron and alloys of iron containing copper, nickel, cobalt, chromium, tin, manganese, and antimony. Any of these materials as such or in combination may be used as a source of iron.

The alkali metal containing compound may be carbonate, hydroxide, sulfate, sulfide, or sulfite. They can be used individually or in combination to form the alkali metal compound of sulfur.

While any or all of these materials could be used, the preferred materials are waste sulfate pickle liquor from sulfuric acid pickling of iron and steel, commercial grade soda ash, and automobile scrap.

The procedure of the process is as follows:

Conversion of the sulfate, sulfide, or sulfite containing material to a sulfur compound of sodium or some other alkali metal. This is accomplished by reacting such materials with an alkali metal compound, preferably sodium carbonate (soda ash) or sodium hydroxide (caustic soda). The sulfur containing alkali metal compound may be separated and used in the subsequent step or the mixed products of reaction consisting of a mixture of sodium sulfate decahydrate ($Na_2SO_4 \cdot 10H_2O$), ferrous hydroxide ($Fe(OH)_2$), and some excess soda ash may be used. Any one of these products may be added to a molten bath of steel which contains copper or may be added to the iron melting cupola in which the iron or steel scrap which contains copper is being melted. The alkali metal sulfide slag which is formed as a result of this operation dissolves copper present in the iron and when the sulfide slag is removed from the molten iron, the iron substantially free from copper is recovered. The sulfide slag after its removal from molten iron is dissolved in water. Alkali metal sulfide dissolves while insoluble sulfides of copper, nickel, cobalt, iron, etc., do not dissolve and settle down as sludge. The copper and other valuable elements are recovered from the sludge while the alkali metal sulfide is recovered from the aqueous solution by crystallization.

The following specific example will illustrate the process:

Example

To 100 grams of spent sulfate pickle liquor from steel processing containing 7 grams of free sulfuric acid ($H_2SO_4$), 22 grams of soda ash ($Na_2CO_3$) was added, at 100° C. and the solution aerated to convert ferrous iron to ferric iron. The resulting precipitate was filtered, washed, and the combined filtrates evaporated and sodium sulfate crystallized from the solution. The crystals were dried at 105° C. The reaction is represented by the following equations:

$$H_2SO_4 + Na_2CO_3 = Na_2SO_4 + H_2O + CO_2$$
$$FeSO_4 + Na_2CO_3 + H_2O = Na_2SO_4 + Fe(OH)_2 + CO_2$$

150 grams of the anhydrous sodium sulfate so prepared is added to 800 grams of a molten bath of iron containing 1 percent copper and saturated with carbon. The molten bath is maintained at a temperature under 1400° C. in an induction furnace. Five minutes after addition of sodium sulfate, the sodium sulfide slag floating on surface of the molten iron is removed and the resulting iron analyzed for copper. The analysis shows that the copper content of the initial melt has been reduced from 1 percent copper to 0.5 percent copper after treatment with sodium sulfide slag formed from the sodium sulfate added to the molten iron. By repeating the procedure, copper in the iron may be reduced to desired level.

My research to date has shown that, for example, spent sulfate pickle liquor containing 7 percent sulfuric acid and 20 percent ferrous sulfate can be treated with soda ash and the sodium sulfate resulting from this treatment can be separated from iron compounds and used as a source of sodium sulfide slag for removal of copper from iron. I have also produced hard solid balls of a mixture of sodium sulfate decahydrate ($Na_2SO_4 \cdot 10H_2O$) and ferrous hydroxide ($Fe(OH)_2$) by adding enough soda ash to waste pickle liquor till the pickle liquor turns to a thick paste. This paste has been converted into pebbles and hardened by air drying. It is planned to substitute this material in place of commercially purchased sulfur containing alkali metal compounds used in the work described in the literature connected with prior art related to removal of copper from iron containing copper.

Many changes can be made in the details of steps of the process without departing from the spirit of the invention. The inventor, therefore, does not wish to be restricted to the exact details and arrangements described, the preferred forms, and steps only have been shown and described by way of illustration. The sulfate pickle liquor or any other sulfate, sulfite, or sulfide containing products may be treated to obtain various sulfur containing alkali metal compounds or their mixtures, and they can be added to the steel processing operation in the iron melting cupola, electric furnace, blast furnace, open hearth, or other types of melting furnaces or they may be added in runners which convey the molten metal from the melting or smelting device to the place where it is to be processed further or they may be added in ladles or in a mixing device. Various other additions may be made to the sulfate containing product prior to, during or after neutralization, e.g., carbonaceous material may be added to the neutralized sulfate pickle liquor to reduce the alkali metal sulfate and ferrous hydroxide resulting from the neutralization of the pickle liquor. The technique described in this invention would also remove nickel, cobalt, tin, antimony, chromium, lead, and other metals whose sulfides are soluble in alkali metal sulfide slag.

Successful use of this invention will abate the disposal problem connected with waste sulfate pickle liquor by converting it into a useful product. It would also make it possible to utilize low grade automobile scrap—the No. 2 bundles of the scrap industry—and convert it into desirable alloy manufacturing grade and deep drawing grade of high quality low carbon steels. It will also conserve the Nation's copper resources by recovering it from the iron. The copper which will be dissolved in the alkali metal sulfide slag could be readily recovered by grindling and dissolving the copper containing molten sulfide slag in water and filtering out the insoluble sulfides of copper, nickel, cobalt, chromium, tin, etc., which usually occur in steel as residual elements.

In my patent proposal I do not make claims for inventing, as such, a process for neutralization of waste sulfuric pickle liquor, acid mine water, or any other sulfur-containing materials, nor do I make claims for utilization of these materials to make pure sodium sulfate. It is obvious that elementary chemical reactions like neutralization of sulfur containing acid aqueous materials could not be patented.

What I claim is processes for removal of copper and other tramp elements from copper contaminated iron like automobile scrap which (the processes) consisting of treating, by a series of well defined steps, such copper containing ferrous materials (automobile scrap) with sulfur containing by product or waste materials which present pollution or disposal problem (waste pickle liquor, acid mine water, etc.) and recover (1) refined iron of marketable quality, (2) a sulfide slag containing copper and other tramp elements which may be present in the ferrous material, (3) acid and iron free water when acid mine water is used, (4) high grade iron oxide, hydroxide or carbonate of micron size particles when waste sulfuric pickle liquor or other iron containing sulfate, sulfide or sulfite byproduct or waste materials are used, (5) high grade hydrochloric acid when waste hydrochloric acid pickle liquor is used.

While I have disclosed certain preferred practices of my invention in the foregoing specification, it will be understood that this invention may be otherwise embodied within the scope of the following claims.

I claim:

1. A process for removal of copper from molten iron consisting of adding enough of a member selected from the group consisting of aluminum metal, oxides, hydroxides and carbonates of alkaline earth metals and alkali metals, ammonia, ammonium hydroxide and carbonate and mixtures thereof to an acidic aqueous sulfur containing waste material to neutralize the acid, evaporating the liquid from the resulting product, adding the resulting solid product to molten iron containing copper whereby a molten slag is formed and removing the resulting molten slag from the surface of the molten iron after allowing sufficient time for the molten slag to dissolve the copper present in the molten iron.

2. A process as claimed in claim 1 in which the member is an alkali metal carbonate and an excess thereof is added.

3. A process for removal of copper from molten iron consisting of adding enough of a member selected from consisting of the group consisting of aluminum metal, oxides, hydroxides, and carbonates of alkaline earth metals and alkali metals and mixtures thereof, ammonia, ammonium hydroxide and ammonium carbonate and mixtures thereof to an acidic aqueous sulfur containing waste material to neutralize the acid and form an insoluble precipitate consisting of at least one member of the group consisting of hydrated oxides, hydroxides, carbonates, sulfates, sulfides, sulfites and mixtures thereof, separating said precipitate, adding to the precipitate enough of an aqueous solution of a member selected from the group consisting of alkali metal oxide, hydroxide, carbonate and mixtures thereof to convert the precipitated sulfur containing compound and mixture of compounds to corresponding soluble alkali metal sulfur containing salts, separating the insoluble product thereof from the aqueous solution of sulfur containing compound, evaporating the liquid from the resulting product, adding the resulting solid product to molten iron containing copper whereby a molten slag is formed and removing the resulting molten slag from the surface of the molten iron after allowing sufficient time for the molten slag to dissolve the copper present in the molten iron.

4. A process as claimed in claim 3 in which an excess of a member selected from the group consisting of alkali metal oxide, hydroxide or carbonate is added to the aqueous acidic solution of the waste sulfur containing material.

5. A process as claimed in claim 3 in which, after adding a member selected from the group consisting of aluminum metal, oxides, hydroxides and carbonates of alkali metals and alkaline earth metals and ammonia, ammonium hydroxide and ammonium carbonate and mixtures thereof to the aqueous acidic solution of the waste sulfur containing material, the mixture is aerated.

6. A process as claimed in claim 3 in which, after addition of a member selected from the group consisting of aluminum metal, oxides, hydroxides and carbonates of alkaline earth metals and alkali metals and ammonia, ammonium hydroxide and ammonium carbonate and mixtures thereof to the sulfur containing acidic aqueous waste material and formation of the precipitate, the aqueous solution is concentrated and sufficient amount of a member selected from the group consisting of alkali metal oxide, hydroxide, carbonate and mixtures thereof is added to the precipitate to form a paste, hardening the paste by standing and then adding it to the molten iron for removal of copper.

7. A process as claimed in claim 6 including, after the paste turns to a hard mass, allowing said paste to sit until the mass changes its color from greenish to brown throughout the hardened mass, mixing with water to leach out and form an aqueous solution of soluble sulfur containing salts of alkali metal, separating insoluble residue from the aqueous solution of sulfur containing salts of alkali metal, evaporating the solution to form a dried residue and adding the dried residue to molten iron for removal of copper.

8. A process as claimed in claim 7 in which there is added to the aqueous solution of sulfur containing alkali metals compounds enough of a member selected from the group consisting of alkali metal oxide, hydroxide carbonate and mixtures thereof to form a paste, allowing the paste to dry by standing and then adding it to molten iron for removal of copper.

9. A process for removal of copper from molten iron consisting of adding enough anhydrous soda ash to spent sulfuric pickle liquor until it attains the consistency of a paste, letting the paste sit long enough to turn into a hard mass, allowing it enough time to cure till the hardened paste changes color from greenish to brown throughout the body of the paste, adding water to the product thus cured, stirring the mixture to leach out soluble sodium sulfate and any excess unreacted sodium carbonate, separating insoluble iron carbonate from the solution, evaporating the solution to form a dried residue, adding the dried residue of sodium sulfate-sodium carbonate to molten iron containing copper whereby a molten slag is formed and removing the resulting slag from the surface of the molten iron after allowing sufficient time for the slag to dissolve the copper present in the molten iron.

10. A process as claimed in claim 9 including separating the iron carbonate from sodium sulfate-sodium carbonate solution, adding enough soda ash to convert the sodium sulfate-sodium carbonate solution into a paste, allowing it to stand till it turns into a hard mass, and adding the resulting product to molten iron containing copper.

11. A process for removal of copper from molten iron consisting of adding enough soda ash to spent sulfuric pickle liqur to neutralize it while continuously aerating the solution to form an insoluble iron salt and a solution of sodium sulfate, separating the insoluble iron salt from sodium sulfate solution formed as a result of neutralization and aeration, adding to the wet iron salt residue enough anhydrous soda ash to make a paste, letting the paste sit long enough to turn into a hard mass and change its color from greenish to brown throughout the mass, adding water to the product thus formed, stirring the mixture to leach out the water soluble components from the paste, separating the insoluble iron salt from the solution, evaporating the solution to dryness, adding the dried residue of water soluble components to molten iron containing copper whereby a molten slag is formed and removing the resulting slag from the surface of the molten iron after allowing sufficient time for the slag to dissolve the copper present in the molten iron.

12. A process for removal of copper from molten iron consisting of adding a member selected from the group consisting of alkaline earth oxide, hydroxide, carbonate and mixtures thereof to an aqueous acidic sulfur containing solution to form a precipitate of hydrated sulfates, sulfides, sulfites, oxides, hydroxides, carbonates and mixtures thereof, separating the precipitated hydrated sulfates, sulfides, sulfites, oxides, hydroxides, carbonates and mixtures thereof, adding to the precipitate enough material from the group consisting of alkali metal oxide, hydroxide, carbonate and mixtures thereof to convert the alkaline earth sulfates to soluble alkali metal sulfates and relatively insoluble alkaline earth oxide, carbonate, hydroxides and mixtures thereof, separating the insoluble residue from the solution of alkali metal sulfates, evaporating the aqueous alkali metal sulfate solution to dryness, adding the alkali metal sulfate to molten iron containing copper whereby a molten slag is formed and removing the resulting molten slag from the surface of the molten iron after allowing sufficient time for the molten slag to dissolve the copper present in the molten iron.

References Cited
UNITED STATES PATENTS

| | | | |
|---|---|---|---|
| 2,038,072 | 4/1936 | Wilson | 23—122 |
| 2,083,562 | 6/1937 | Harth et al. | 75—53 |
| 2,334,621 | 11/1943 | Goodell | 23—122 |
| 2,512,578 | 6/1950 | Jordan | 75—53 |
| 2,775,508 | 12/1956 | Thomsen | 23—117 |
| 3,261,665 | 7/1966 | Rathmell | 23—122 |

RICHARD O. DEAN, *Primary Examiner.*

U.S. Cl. X.R.

23—114; 75—58